US011056118B2

United States Patent
Martínez González et al.

(10) Patent No.: US 11,056,118 B2
(45) Date of Patent: Jul. 6, 2021

(54) SPEAKER IDENTIFICATION

(71) Applicant: Cirrus Logic International Semiconductor Ltd., Edinburgh (GB)

(72) Inventors: David Martínez González, Saragossa (ES); Carlos Vaquero Avilés-Casco, Madrid (ES)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/021,637

(22) Filed: Jun. 28, 2018

(65) Prior Publication Data

US 2019/0005962 A1 Jan. 3, 2019

Related U.S. Application Data

(60) Provisional application No. 62/526,558, filed on Jun. 29, 2017.

(51) Int. Cl.
| | |
|---|---|
| *G10L 17/14* | (2013.01) |
| *G10L 17/02* | (2013.01) |
| *G10L 17/12* | (2013.01) |

(52) U.S. Cl.
CPC .............. *G10L 17/14* (2013.01); *G10L 17/02* (2013.01); *G10L 17/12* (2013.01)

(58) Field of Classification Search
CPC ................................ G10L 17/14; G06F 3/167
USPC ........................................................ 704/257
See application file for complete search history.

(56) References Cited

U.S. PATENT DOCUMENTS

| | | | | |
|---|---|---|---|---|
| 6,233,555 B1* | 5/2001 | Parthasarathy | ......... | G10L 17/04 704/240 |
| 6,519,561 B1* | 2/2003 | Farrell | .................... | G10L 15/07 704/232 |
| 2007/0055530 A1* | 3/2007 | Onishi | .................... | G10L 17/04 704/275 |
| 2010/0217590 A1* | 8/2010 | Nemer | .................. | G01S 3/8006 704/233 |
| 2013/0225128 A1* | 8/2013 | Gomar | .................. | H04W 12/06 455/411 |
| 2015/0112684 A1* | 4/2015 | Scheffer | .................. | G10L 17/14 704/257 |

(Continued)

FOREIGN PATENT DOCUMENTS

| | | |
|---|---|---|
| GB | 2551209 A | 12/2017 |
| GB | 2552082 A | 1/2018 |

OTHER PUBLICATIONS

Combined Search and Examination Report under Sections 17 and 18(3), Application No. GB1713167.3, dated Feb. 15, 2018.

*Primary Examiner* — Edwin S Leland, III
(74) *Attorney, Agent, or Firm* — Jackson Walker L.L.P.

(57) ABSTRACT

A method of speaker identification comprises receiving a speech signal and dividing the speech signal into segments. Following each segment, a plurality of features are extracted from a most recently received segment, and scoring information is derived from the extracted features of the most recently received segment. The scoring information derived from the extracted features of the most recently received segment is combined with previously stored scoring information derived from the extracted features of any previously received segment. The new combined scoring information is stored, and an identification score is calculated using the combined scoring information.

17 Claims, 4 Drawing Sheets

(56) References Cited

U.S. PATENT DOCUMENTS

| | | | |
|---|---|---|---|
| 2015/0286459 A1* | 10/2015 | Habets | G10K 11/346 700/94 |
| 2016/0006830 A1* | 1/2016 | Houdaille | H04L 67/2842 709/213 |
| 2016/0155020 A1* | 6/2016 | Tariq | G06K 9/6215 382/105 |
| 2016/0293167 A1* | 10/2016 | Chen | H04N 21/23476 |
| 2017/0011406 A1* | 1/2017 | Tunnell | H04W 12/06 |
| 2017/0090854 A1* | 3/2017 | Richardson | G06F 3/165 |
| 2017/0294185 A1* | 10/2017 | Bradley | G10L 25/51 |
| 2017/0351487 A1* | 12/2017 | Aviles-Casco Vaquero | G10L 17/00 |
| 2017/0357478 A1* | 12/2017 | Piersol | G10L 15/30 |
| 2017/0372725 A1* | 12/2017 | Khoury | G10L 25/27 |
| 2018/0040323 A1* | 2/2018 | Lesso | G10L 17/04 |
| 2018/0040325 A1* | 2/2018 | Melanson | G10L 17/00 |
| 2018/0201226 A1* | 7/2018 | Falkson | G06F 21/32 |
| 2018/0293988 A1* | 10/2018 | Huang | G10L 17/20 |
| 2018/0342250 A1* | 11/2018 | Cohen | G10L 17/00 |
| 2018/0342251 A1* | 11/2018 | Cohen | G10L 13/08 |
| 2018/0358013 A1* | 12/2018 | Yoon | G10L 15/26 |
| 2019/0005962 A1* | 1/2019 | Martinez Gonzalez | G10L 17/12 |
| 2019/0080697 A1* | 3/2019 | Grancharov | G10L 17/20 |
| 2019/0182261 A1* | 6/2019 | Carbune | G10L 15/22 |
| 2020/0066281 A1* | 2/2020 | Grancharov | G10L 17/06 |

\* cited by examiner

SPEAKER IDENTIFICATION

TECHNICAL FIELD

This disclosure relates to the field of speaker identification, and in particular relates to the use of scoring information for summarizing previously received audio data and for performing an identification update when new data is received.

BACKGROUND

This disclosure relates to a Voice User Interface (VUI), that is, a user interface where a user's voice is considered an input, for example in a virtual assistant in a mobile device. Secure Voice User Interfaces are VUIs where voice biometrics are used to authenticate the user.

One aim of a voice biometrics system may be to confirm that a speaker is a registered user of the system.

In the case of a Voice User Interface in a virtual assistant, the user may enter into a dialogue with the virtual assistant. For example, in such a dialogue the virtual assistant may provide prompts for additional information or for more detail about a command from the user. The reliability of the authentication decision provided by the voice biometrics system should in general be improved by taking account of as much as possible of the user's speech. Thus, in the case of a dialogue between the user and the virtual assistant, the system can take advantage of long user interactions to output a more reliable decision.

However, one drawback to outputting a reliable decision based on large amounts of speech data is that this would need a large amount of memory, to store the large amount of data to be processed by the voice biometrics system, and a large amount of computational power to process all the data with an acceptable latency for the user, once an authentication decision is required.

SUMMARY

According to one aspect of the present invention, there is provided a method of speaker identification, comprising: receiving a speech signal; dividing the speech signal into segments; and, following each segment: extracting a plurality of features from a most recently received segment; deriving scoring information from the extracted features of the most recently received segment; combining the scoring information derived from the extracted features of the most recently received segment with previously stored scoring information derived from the extracted features of any previously received segment; storing the combined scoring information; and calculating an identification score using the combined scoring information.

Combining the scoring information derived from the extracted features of the most recently received segment with previously stored scoring information derived from the extracted features of any previously received segment, and storing the combined scoring information, may comprise forming updated combined scoring information having a size that is the same as a size of the previously stored scoring information.

Combining the scoring information derived from the extracted features of the most recently received segment with previously stored scoring information derived from the extracted features of any previously received segment, and storing the combined scoring information, may comprise storing said scoring information derived from the extracted features of the most recently received segment together with at least some of said previously stored scoring information.

The segments may be of equal lengths. Thus, the method may comprise dividing the speech signal into segments covering equal length periods of time. Or, the method may comprise dividing the speech signal into segments containing equal durations of net speech.

The features of the speech signal may comprise Mel Frequency Cepstral Coefficients (MFCCs).

Deriving scoring information from the extracted features of the most recently received segment may comprise computing sufficient statistics of the features.

The sufficient statistics may comprise zeroth order sufficient statistics. The sufficient statistics may comprise first order sufficient statistics. The sufficient statistics may comprise second order sufficient statistics.

The method may comprise: combining the scoring information derived from the extracted features of the most recently received segment with any previously stored scoring information derived from the extracted features of any previously received segment by forming a weighted sum of (a) the scoring information derived from the extracted features of the most recently received segment, and (b) the previously stored scoring information.

The method may comprise forming the weighted sum by applying respective weights to (a) the scoring information derived from the extracted features of the most recently received segment, and (b) the previously stored scoring information, based on respective quality measures of said scoring information. The respective quality measures may relate to amounts of speech in the respective speech segments. The respective quality measures may relate to a quality of respective sections of the speech signal.

According to a second aspect of the present invention, there is provided a system for speaker identification, configured for: receiving a speech signal; dividing the speech signal into segments; and following each segment: extracting a plurality of features from a most recently received segment; deriving scoring information from the extracted features of the most recently received segment; combining the scoring information derived from the extracted features of the most recently received segment with previously stored scoring information derived from the extracted features of any previously received segment; storing the combined scoring information; and calculating an identification score using the combined scoring information.

Combining the scoring information derived from the extracted features of the most recently received segment with previously stored scoring information derived from the extracted features of any previously received segment, and storing the combined scoring information, may comprise forming updated combined scoring information having a size that is the same as a size of the previously stored scoring information.

Combining the scoring information derived from the extracted features of the most recently received segment with previously stored scoring information derived from the extracted features of any previously received segment, and storing the combined scoring information, may comprise storing said scoring information derived from the extracted features of the most recently received segment together with at least some of said previously stored scoring information.

The segments may be of equal lengths. The system may be configured for dividing the speech signal into segments covering equal length periods of time. The system may be configured for dividing the speech signal into segments containing equal durations of net speech.

The features of the speech signal may comprise Mel Frequency Cepstral Coefficients (MFCCs).

The system may be configured for deriving scoring information from the extracted features of the most recently received segment by computing sufficient statistics of the features. The sufficient statistics may comprise zeroth order sufficient statistics, and/or first order sufficient statistics, and/or second order sufficient statistics.

The system may be further configured for: combining the scoring information derived from the extracted features of the most recently received segment with any previously stored scoring information derived from the extracted features of any previously received segment by forming a weighted sum of (a) the scoring information derived from the extracted features of the most recently received segment, and (b) the previously stored scoring information.

The system may be configured for forming the weighted sum by applying respective weights to (a) the scoring information derived from the extracted features of the most recently received segment, and (b) the previously stored scoring information, based on respective quality measures of said scoring information. The respective quality measures may relate to amounts of speech in the respective speech segments, and/or a quality of respective sections of the speech signal.

According to a third aspect of the present invention, there is provided a device comprising a system according to the second aspect. The device may comprise a mobile telephone, an audio player, a video player, a mobile computing platform, a games device, a remote controller device, a toy, a machine, or a home automation controller or a domestic appliance.

According to a fourth aspect of the present invention, there is provided a computer program product, comprising a computer-readable tangible medium, and instructions for performing a method according to the first aspect.

According to a fifth aspect of the present invention, there is provided a non-transitory computer readable storage medium having computer-executable instructions stored thereon that, when executed by processor circuitry, cause the processor circuitry to perform a method according to the first aspect.

According to a sixth aspect of the present invention, there is provided a device comprising the non-transitory computer readable storage medium according to the fifth aspect. The device may comprise a mobile telephone, an audio player, a video player, a mobile computing platform, a games device, a remote controller device, a toy, a machine, or a home automation controller or a domestic appliance.

The invention also provides a non-transitory computer readable storage medium having computer-executable instructions stored thereon that, when executed by processor circuitry, cause the processor circuitry to perform any of the methods set out above.

Thus, the scoring information can be defined so that large amounts of user speech can be summarized be either in a fixed amount of scoring information size or in an acceptably small amount of scoring information. Alternatively, or additionally, the scoring information can be defined so that calculating a voice biometrics score and making an authentication decision based on the scoring information has a fixed computational cost, so that the amount of available user speech does not adversely affect the latency of the decision.

BRIEF DESCRIPTION OF DRAWINGS

For a better understanding of the invention, and to show more clearly how it may be carried into effect, reference will now be made, by way of example only, to the accompanying drawings in which.

DETAILED DESCRIPTION

For clarity, it will be noted here that this description refers to speaker recognition and to speech recognition, which are intended to have different meanings. Speaker recognition refers to a technique that provides information about the identity of a person speaking. For example, speaker recognition may determine the identity of a speaker, from amongst a group of previously registered individuals, or may provide information indicating whether a speaker is or is not a particular individual, for the purposes of identification or authentication. Speech recognition refers to a technique for determining the content and/or the meaning of what is spoken, rather than recognising the person speaking.

Figure 1:
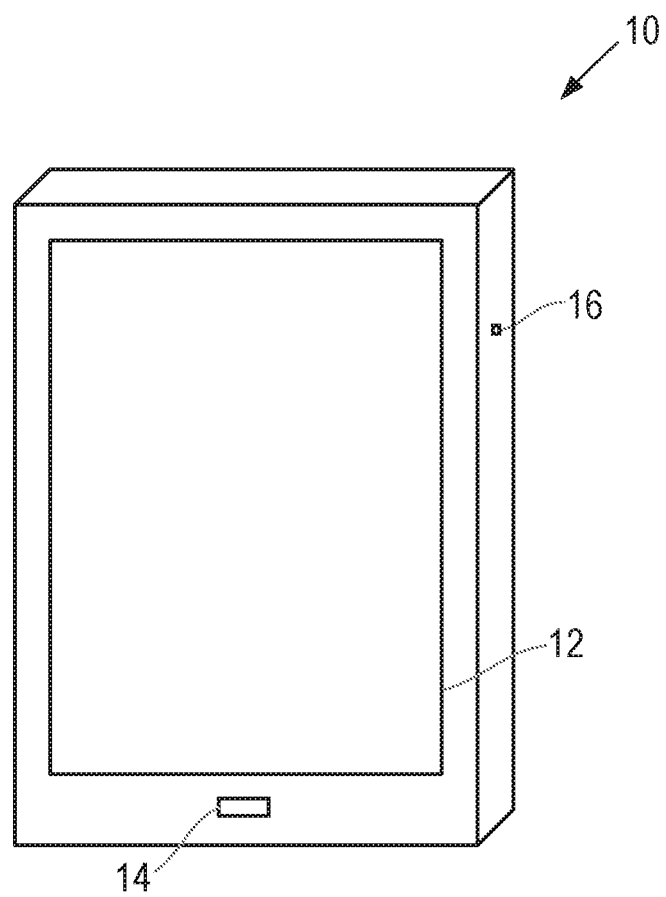
FIG. 1 is a schematic view of an electronic device.

FIG. 1 shows a device in accordance with one aspect of the invention. The device may be any suitable type of device, such as a mobile computing device for example a laptop or tablet computer, a games console, a remote control device, a home automation controller or a domestic appliance including a domestic temperature or lighting control system, a toy, a machine such as a robot, an audio player, a video player, or the like, but in this illustrative example the device is a mobile telephone, and specifically a smartphone 10. The smartphone 10 may, by suitable software, be used as the control interface for controlling a further device or system.

The smartphone 10 includes a screen 12 for displaying information to a user, a sound inlet 14, for allowing sound to be detected by a microphone, and a jack socket 16, or other port or receptacle, for allowing an accessory to be connected to the device.

In some examples, the user provides spoken inputs, for example requests or commands, to the device 10. These requests or commands may relate to processes performed on the device itself. For example, the spoken input may be a request for information to be provided via web browser software on the device itself. Alternatively, the requests or commands may relate to processes performed on a separate device. For example, the spoken input may request that a control signal be sent to a domestic heating or lighting system.

In such examples, it is desirable to verify that the speaker is an enrolled user of the device.

In some embodiments, the user interacts with a virtual assistant to execute a command. The interaction can take an extended time period, for example more than 10 seconds. When the interaction starts (for example by the user uttering a trigger phrase or by taking some other action such as pushing a button) an authentication score is computed as described in more detail below and, at the end of the interaction, an authentication decision is made. Alternatively, an authentication decision may be made periodically during the interaction based on a cumulative authentication score derived from the speech received to that point. The most recent authentication can then be output as soon as an authentication request is received, with minimal latency.

Figure 2:
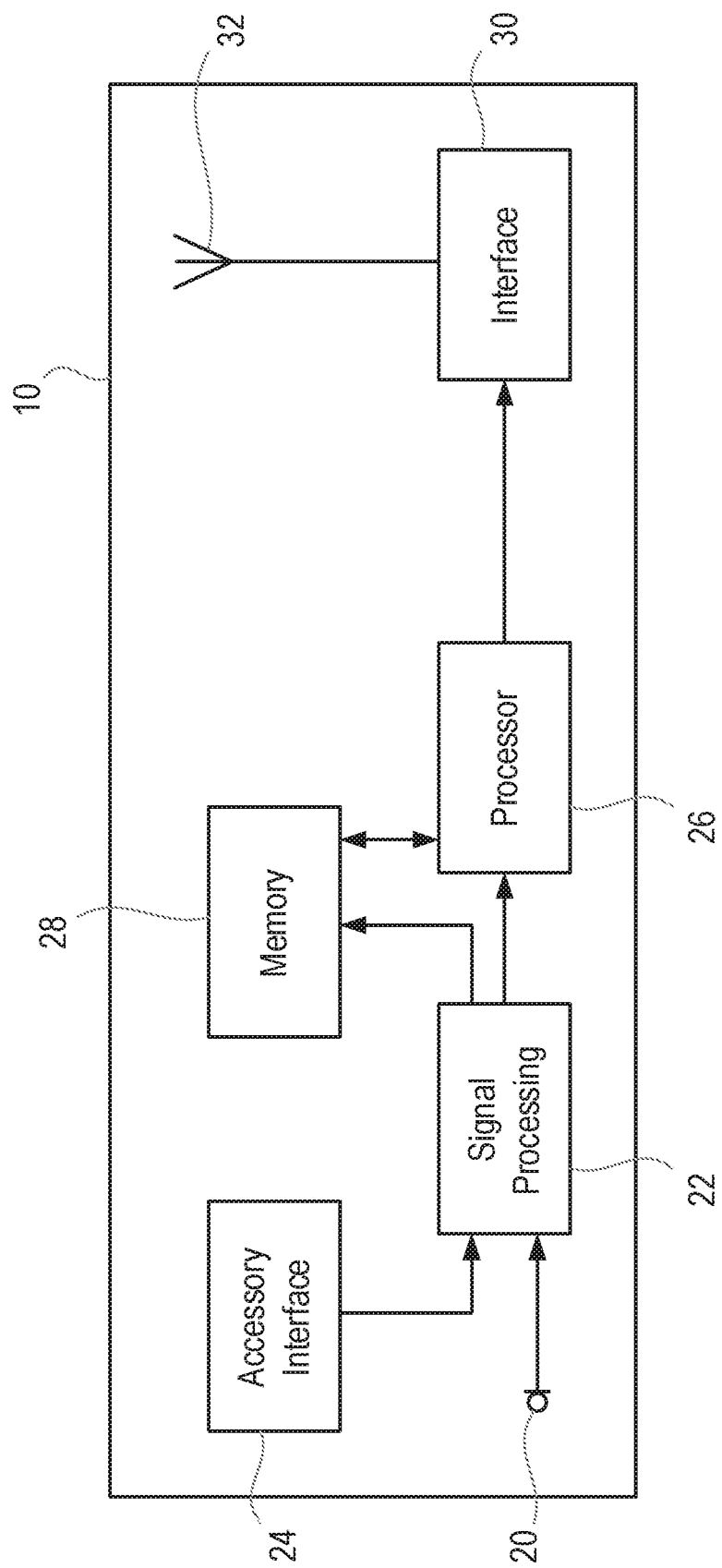
FIG. 2 is a further schematic diagram of an electronic device.

FIG. 2 is a schematic diagram showing the smartphone 10. In this example, the smartphone 10 includes a microphone 20, which may for example be located close to the sound inlet 14 shown in FIG. 1. Electronic signals generated by the microphone 20 are passed to a signal processing block 22, which performs initial signal processing of the signals, for example converting analog signals received from the microphone 20 into digital signals.

The smartphone 10 also includes an accessory interface 24, which may for example be located close to the jack socket 16 shown in FIG. 1. The jack socket 16 and the interface 24 may be suitable for allowing a headset accessory to be connected thereto, and signals received from a microphone on such an accessory are also passed to the signal processing block 22, which performs initial signal processing of the signals.

The signal processing block 22 is connected to a processor 26, which performs methods as described herein on the basis of data and program instructions stored in a memory 28. Specifically, the methods described herein can be performed on the processor 26 by executing instructions that are stored in non-transient form in the memory 28, with the program instructions being stored either during manufacture of the device 10 or by upload while the device 10 is in use.

The processor 26 is connected to an interface 30, which is itself connected to an antenna 32, allowing signals to be transmitted to remote devices and received from remote devices over an external network.

In other examples, the device performing the processes described herein may receive the required input signals in a suitable form, without needing to perform any prior signal detection or signal processing and thus not requiring the device to comprise signal processing block 22.

In some examples, some of the processing described below may be performed on an external device communicated with via an external network, for example a remote computing server or a server in a home network. In other examples, all of the processing described below may be performed in a single device, without requiring the device to comprise any interface to any external device or network.

Figure 3:
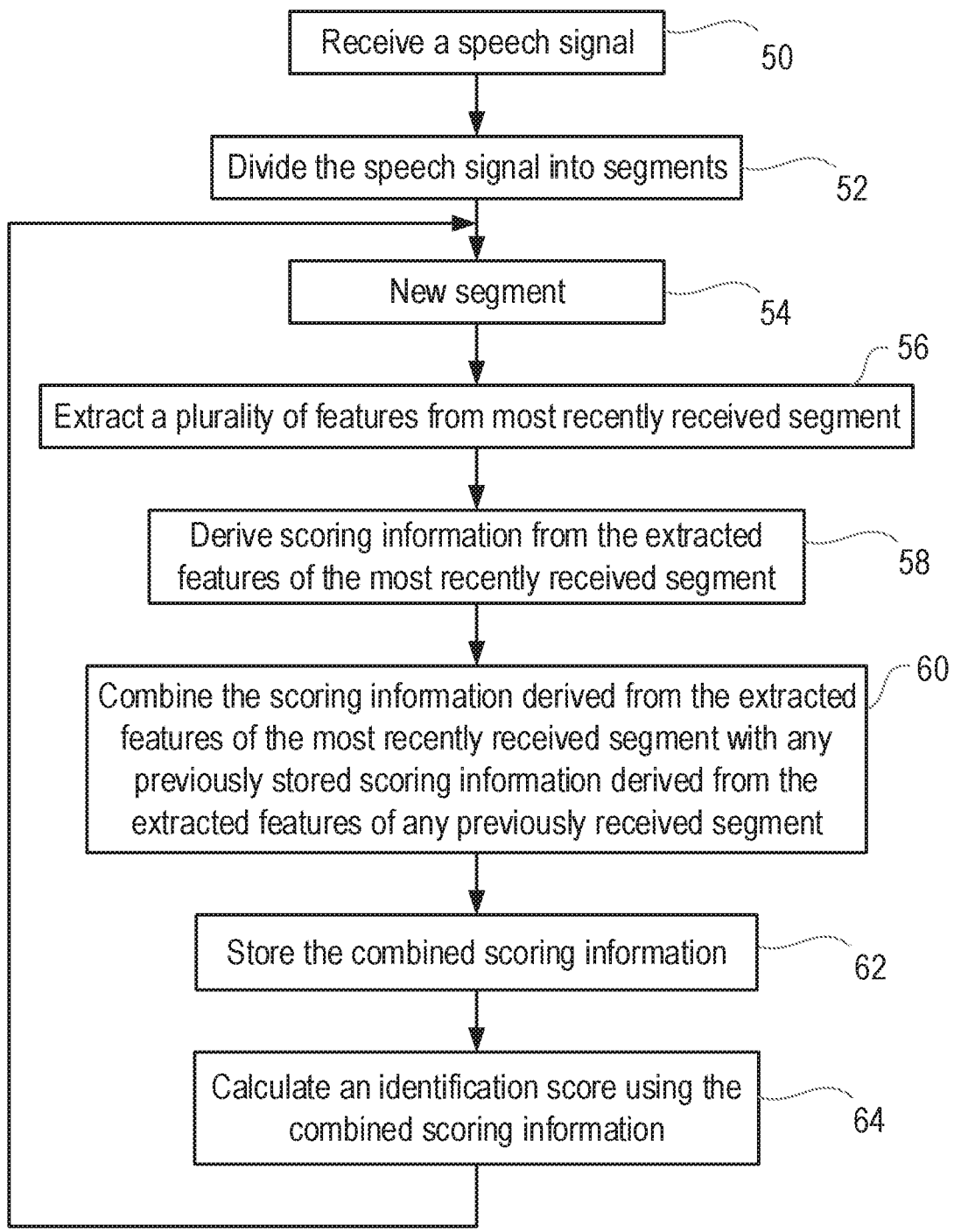
FIG. 3 is a flow chart, illustrating a method.

FIG. 3 is a flow chart, illustrating a method of operation of a voice user interface according to one embodiment.

The process shown in FIG. 3, and described in more detail below, is performed after a user has registered with the system, for example by providing one or more sets of voice samples that can be used to form one or more model of the user's speech. Typically, the registration or enrolment process requires the user to provide speech inputs, and then uses these speech inputs to form a model of the user's speech, starting from a particular background model defined in a prior development phase. Thus, the background model and the speech inputs are the inputs to the enrolment process that is used to form the model of the user's speech. Subsequently, during verification, as described in more detail below, further speech inputs are compared with the model of the user's speech, and with a background model, in order to provide an output. An output of this comparison may for example be a numerical value indicating a likelihood that the speech inputs received during the verification phase were provided by the same user that provided the speech inputs during enrolment. The numerical value indicative of the likelihood may be for example a log likelihood ratio (LLR) or may be some more indirect indication, for example a metric of distance of extracted features of the speech sample from some one- or multi-dimensional threshold.

The voice user interface may spend the majority of its time in a standby state, in order to save power. A voice activity detection block may be provided, for determining when sounds that are detected by a microphone represent speech. In some embodiments, signals that are received from a microphone are stored. Then, when the voice activity block determines that the sounds that are detected by the microphone represent speech, those stored signals are analysed as described below.

The signal that is determined to represent speech may be sent to a speech recognition block, to determine the content of the speech. The method set out below may be initiated in response to determining that a predetermined trigger phrase has been spoken.

In step 50, the voice user interface receives the speech signal. The speech signal may for example result from an interaction with a virtual assistant. For example, in one typical interaction, a user may first speak a trigger phrase to wake the virtual assistant, and may then speak an initial query, in response to which the virtual assistant provides some information, and the user then speaks a further command. The speech signal may therefore represent multiple discrete sections of speech. In other cases, the speech signal may represent continual speech from the user.

In step 52, the received speech signal is divided into segments. This division may take place as the speech signal is being received.

For example, when the speech signal contains a trigger phrase, plus one or more subsequent spoken commands or queries, the trigger phrase may be treated as the first segment.

The part of the speech signal after the trigger phrase may be divided into segments of equal lengths. More specifically, the part of the speech signal after the trigger phrase may be divided into segments covering equal length periods of time. Alternatively, the part of the speech signal after the trigger phrase may be divided into segments comprising equal durations of net speech. When it is detected that a user has stopped speaking, then the final part of the speech since the end of the previous segment may be considered to be a final segment that is shorter than the normal segment length.

That is, the speech signal may cover a period of several seconds. In some cases, the user will be speaking for the whole of that period. In other cases, there may be periods when the virtual assistant is providing an output, or there may be periods of silence. In such cases, the part of the speech signal after the trigger phrase may be divided into segments covering equal length periods of elapsed time (for example 1 second), even though different segments will contain different amounts of the user's speech. Alternatively, the part of the speech signal after the trigger phrase may be divided into segments comprising equal durations of the user's speech, even though the segments may then cover different elapsed durations. However, the segments may be of unequal lengths.

In step 54, it is recognised that a speech segment has been completed. For example, this may be when one of the equal length periods of time has expired, or when a predetermined duration of the user's speech has been received.

In step 56, a plurality of features are extracted from a most recently received segment. The features that are extracted are features representing the input audio that can be used in the voice biometrics for performing speaker identification. For example, the features that are extracted could be Mel Frequency Cepstral Coefficients (MFCCs). Other features that can be extracted from the speech signal include Perceptual Linear Prediction (PLP) features, Linear Prediction Coding (LPC) features, and bottleneck or tandem features extracted with a deep neural network (DNN). Acoustic features such as MFCCs, PLP features and LPC features can be combined with the DNN-extracted features.

In step 58, scoring information is derived from the extracted features of the most recently received segment. The scoring information that is required will depend on the type of voice biometric system that is used. For example, for a system using a Gaussian Mixture Model (GMM) or a Hidden Markov Model (HMM), the scoring information that is extracted may comprise statistics summarizing the extracted features.

In step 60, the scoring information derived from the extracted features of the most recently received segment is combined with previously stored scoring information derived from the extracted features of any previously received segment.

In some embodiments, the combined scoring information has a fixed size, measured in terms of the number of bits of memory required to hold the information. That is, the scoring information derived from the extracted features of each segment of the speech signal has a certain size, regardless of the length of the segment. When the scoring information derived from the extracted features of the second segment of the speech signal is combined with the previously stored scoring information derived from the extracted features of the first received segment, the combined scoring information has the same size. Similarly, when the scoring information derived from the extracted features of the third segment of the speech signal is combined with the previously stored combined scoring information derived from the extracted features of the first and second received segments, the new updated combined scoring information still has the same size, and this continues for as long as speech segments are received.

This has the advantage that the amount of memory that must be used for storing the scoring information is fixed.

In other embodiments, the amount of memory that must be used for storing the combined scoring information is not fixed. In these embodiments, the scoring information derived from the extracted features of each segment of the speech signal has a compact size, and the combined scoring information is the set of separate pieces of scoring information derived from the extracted features of each segment of the speech signal. In such embodiments, although it is necessary to store separate scoring information derived from the extracted features of each segment of the speech, the compact size of each piece of scoring information means that the total amount of memory that must be used for storing the combined scoring information is acceptable.

In these embodiments, in order to ensure that the total amount of memory that must be used for storing the combined scoring information does not exceed an upper limit, it is possible to restrict the amount of scoring information that is stored, for example by storing only the scoring information derived from the extracted features of a fixed number of most recently received segments of the speech signal.

In step 62, the combined scoring information is stored for future use as described above.

In step 64, an identification score is calculated using the combined scoring information. This identification score can be used to determine the identity of the speaker who provided the input for the received speech signal.

In the example process shown in FIG. 3, the identification score is generated following each respective new segment of the speech, and then the process returns to step 54 when a further new segment is received.

In other examples, after the combined scoring information has been stored in step 62, an identification score is calculated in step 64 only if an explicit prompt to do so is received; otherwise the process returns immediately to step 54 to await a further new segment. For example, the identification score may be generated in response to a specific request from another process, or the identification score may be generated in response to determining that the user has stopped speaking, for example.

Figure 4:
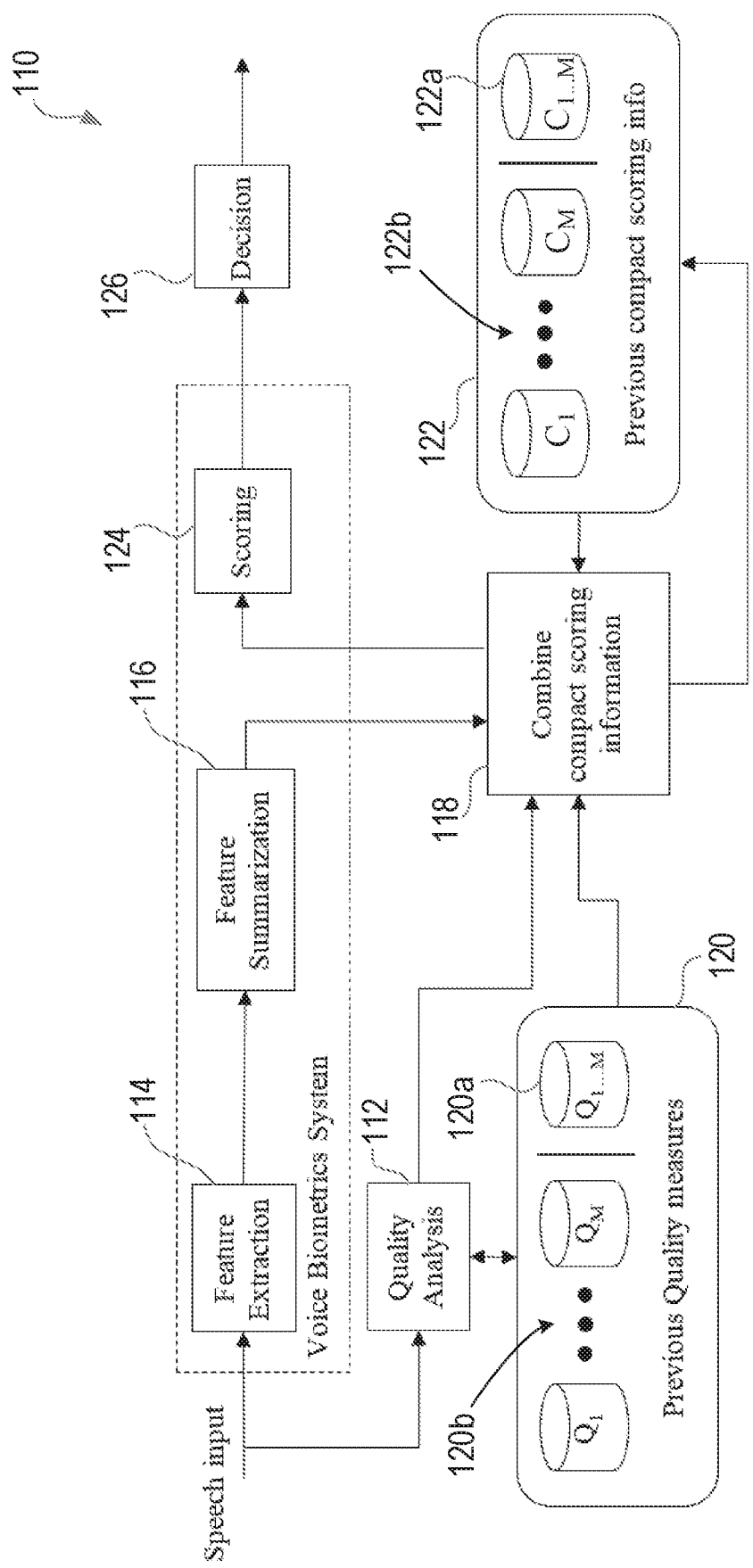
FIG. 4 is a block diagram, illustrating a processing system.

FIG. 4 is a block diagram, illustrating a general form of a speaker recognition system 110, for use in a virtual assistant system, in one embodiment. The functions illustrated in FIG. 4 may be performed in a processor 26 of a smartphone 10, as shown in FIG. 2, or they may be performed in a separate system, for example in a cloud computing environment. In general, computationally-intensive tasks may advantageously be performed remotely in order to save power in the portable device, and similarly tasks that would impose impractical data storage requirements on a portable device may be performed remotely, while less computationally-intensive tasks, and tasks involving private data may advantageously be performed in the user's smartphone. For example, speech recognition may be performed remotely, while speaker recognition is performed in the smartphone itself, though many different assignments of the tasks can be devised.

In this example, it is assumed that a user has enrolled with the system by providing spoken inputs to the system, in order to train the system, during the enrolment phase. This further description then relates to the verification phase, during which it is determined whether a speaker can be taken to be the enrolled user.

Although not shown in FIG. 4, the system 110 may comprise a block for determining whether a trigger phrase has been detected. The detection of the trigger phrase can use a voice activity detector (VAD) and/or a speech recognition process. This block will typically contain a buffer that will be continually storing the most recently received part of the speech signal. The buffer should in this case be long enough to store speech of at least the duration of the expected trigger phrase. Then, when it is determined that the trigger phrase has been spoken, without making any determination as to whether it was spoken by the enrolled user, the speech signal is provided as an input to the speaker recognition system 110. As described in more detail below, the speech signal that is provided as an input to the speaker recognition system 110 may exclude the trigger phrase. Alternatively, when the trigger phrase detection block contains a buffer that is continually storing the most recently received part of the speech signal, the speech signal that is provided as an input to the speaker recognition system 110 may include the trigger phrase.

In other examples, there may be no trigger phrase, and the system may be activated by some other action of the user, such as pressing a button or performing some other form of authentication. In that case, the whole of the speech signal is passed to the speaker recognition system 110.

Preferably, the speech signal that is passed to the speaker recognition system 110 contains only the user's speech. For example, when the speaker recognition system 110 is used in a virtual assistant system, a virtual assistant may speak to a user in response to a command in order to elicit further information from the user, and so the user's speech may in that case be interrupted by the virtual assistant speaking. The speech signal that is passed to the speaker recognition system 110 may omit any speech generated by the virtual assistant.

The received speech signal is divided into segments of the user's speech.

In this example, the user's speech is divided into segments of equal lengths. More specifically, the user's speech may be divided into segments covering equal length periods of time, or into segments comprising equal durations of net speech, for example.

The length of a segment can be chosen to be any desired length. It could be as small as a single feature vector (for example 10 ms), or as long as a series of complete user utterances (tens of seconds or more).

The speech signal may be passed to a quality analysis block 112, described in more detail below.

Each new segment of the speech signal is passed to a feature extraction block 114. Typically, the process of speaker recognition involves extracting relevant features of the speech signal, for example Mel Frequency Cepstral Coefficients (MFCCs), and using these features as the basis for a statistical speaker recognition process. Other features that can be extracted from the speech signal include Perceptual Linear Prediction (PLP) features and Linear Prediction Coding (LPC) features.

The features extracted by the feature extraction block 114 are passed to a feature summarization block 116, which derives scoring information that can be used in generating an identification score.

In certain embodiments, the scoring information has a compact form. The scoring information derived by summarizing the features of one segment of speech can be used to generate an identification score relating only to that segment of speech. In the examples described here, the scoring information derived by summarizing the features of one segment of speech can be combined with the scoring information derived by summarizing the features of earlier segments of speech, with the combined scoring information being used to generate an identification score relating to some or all of the speech received up until the present time.

The nature of the compact scoring information depends on the voice biometrics system that is being used.

In example embodiments that use voice biometrics systems based on GMM or HMM, the features that are obtained from each segment of speech can be any of the features mentioned above, such as MFCCs, PLP features, LPC features, and/or bottleneck or tandem features extracted with a deep neural network (DNN). These features can be summarized by computing the sufficient statistics and using them as compact scoring information. In certain embodiments, the zeroth order sufficient statistics N, the first order sufficient statistics F, and the second order sufficient statistics S are needed.

In that case, the compact scoring information C can be defined as the triplet:

$$C = \{N, F, S\}$$

For a sequence of T features $X = \{x_1, \ldots, x_T\}$, and for example considering a Universal Background Model (UBM) to summarize speaker-independent speech features which is a GMM with G Gaussian components with weight, mean and covariance for the Gaussian component g defined by the triplet $\{w_g, \mu_g, \Sigma_g\}$, the sufficient statistics can be computed as:

$$N_g = \sum_T \gamma_g(x_t)$$

$$F_g = \sum_T \gamma_g(x_t) x_t$$

$$S_g = \sum_T \gamma_g(x_t) x_t x_t^*$$

where $\gamma_g(x_t)$ is the responsibility of Gaussian g which is defined as the probability that the Gaussian g generated the feature vector $x_t$, defined as:

$$\gamma_g(x_t) = \frac{P(x_t, g)}{\sum_{h=1\ldots G} P(x_t, h)}$$

$$P(x_t, g) = w_g P(x_t | \mu_g, \Sigma_g)$$

and $$P(x_t, h) = w_h P(x_t | \mu_h, \Sigma_h)$$

and $P(x_t | \mu_g, \Sigma_g)$ is the likelihood of $x_t$ for Gaussian model with mean $\mu_g$ and covariance $\Sigma_g$.

The size of the sufficient statistics is fixed, and for a GMM-UBM with G components and feature vectors of dimension D the sizes of the different sufficient statistics are given by:

$$N = \begin{bmatrix} N_1 \\ \vdots \\ N_G \end{bmatrix},$$

which has a size of (G×1)

$$F = \begin{bmatrix} F_1 \\ \vdots \\ F_G \end{bmatrix},$$

which has a size of ((G×D)×1)

$$S = \begin{bmatrix} S_1 & \overline{0} & \overline{0} \\ \overline{0} & \ddots & \overline{0} \\ \overline{0} & \overline{0} & S_G \end{bmatrix},$$

which has a size of (D×G)×(D×G), or (D×D)×G excluding zeroes.

Note that S is a diagonal block matrix, and so there is no need to store the zeros off of the diagonal blocks, only G matrices $S_1, \ldots, S_G$ having dimensions (D×D). Storage can be reduced further taking into account that the matrices $S_g$ are symmetric, and even further if the covariances $\Sigma_g$ are diagonal (so only a column of size ((G×D)×1) is needed for S).

It can therefore be seen that the total size of $C = \{N, F, S\}$ is independent of the length T of the feature sequence X, and so in this way the compact scoring information for a speech segment has a fixed size.

The same features can be extracted, and the sufficient statistics can be used as the compact scoring information, for systems that are based on any Joint Factor Analysis (JFA) technique, or three-mode factor analysis (TMFA).

Thus, in some embodiments, the compact scoring information derived from the extracted features comprises the sufficient statistics as described above. In other embodiments, for example when the speaker identification system uses probabilistic linear discriminant analysis (PLDA), cosine distance scoring, or a support vector machine (SVM) classifier, the compact scoring information may comprise identity vectors (i-vectors) obtained from the extracted features. These can alternatively be passed to a neural network for determining the identification score used for determining whether the signal is obtained from the enrolled speaker.

Thus, an i-vector can itself be a form of compact scoring information itself. An i-vector is a fixed-length low-dimensional feature vector that represents an utterance or an audio segment. Hence it can be updated every time that new data comes into the system. An i-vector extracted from an audio segment under evaluation can be evaluated directly by comparing it with a target i-vector (obtained from the enrolled speaker). Then, the test i-vector can be updated every time that new data arrives.

The update can be made just by substitution if the new i-vector is recalculated completely from the whole audio captured up to the current moment.

Alternatively, the i-vector can be updated, by storing the sufficient statistics up to the current moment and updating these with the sufficient statistics of the current segment. Then, the new i-vector would be computed from the updated sufficient statistics.

As a further alternative, an average i-vector can be calculated, which would be updated every segment. In this case the average i-vector is stored up to the current moment, and the average is updated with the i-vector of the current segment.

The score can then be computed with techniques such as dot scoring or PLDA.

In a PLDA system we could store the sufficient statistics of the i-vectors. The statistics that we need to update to compute the score that we need to update are the zeroth order (N) and first order (F), which for i-vectors $w_i$ are defined as:

$$N = \sum_i i$$

$$F = \sum_i w_i$$

The projection of sufficient statistics or miniStats, described above, also applies in this case.

The compact scoring information derived by the feature summarization block 116 is passed to a combination block 118, for combination with any previously derived compact scoring information relating to previous speech segments.

In a first embodiment, the combination block 118 combines the compact scoring information extracted from the newly received audio with a previously stored item of combined compact scoring information that represents a summary of all previously available input audio in the current user interaction or context, and so the resulting new combined compact scoring information that is to be used in performing the authentication summarizes all of the available data.

For example, if the sufficient statistics for a GMM-UBM are used as the compact scoring information as described above, the combination of newly received compact scoring information and previously stored compact scoring information is achieved by simply adding them up.

Thus, assuming that $C_m = \{N(m), F(m), S(m)\}$ represents the compact scoring information extracted for a speech segment m, and $C_{1...M}$ represents the accumulated compact scoring information for segments m=1, 2, ..., M, then the accumulated scoring information can be obtained as:

$$C_{1...M} = \left\{ \sum_M N(m), \sum_M F(m), \sum_M S(m) \right\}$$

Therefore, in order to accumulate the sufficient statistics to summarize all available data, it is simply necessary to keep accumulating the statistics as follows:

$$C_{1...M+1} = C_{1...M} + C_{M+1} =$$
$$= \left\{ \sum_M N(m) + N(M+1), \right.$$
$$\sum_M F(m) + F(M+1),$$
$$\left. \sum_M S(m) + S(M+1) \right\}$$

It will be noted that the size of $C_m$ is the same for all m and equal to the size of $C_{1...M}$ for all M. Thus, in this first embodiment, it is only necessary to store, as a summary of all previous data, one instance of compact scoring information $C_{1...M}$ of fixed size, as shown at 122a in FIG. 4, no matter the length of the input audio and how often the score is updated.

Optionally quality and reliability measures can be stored for the accumulated compact scoring information.

In this case, the speech signal is passed to the quality analysis block 112, mentioned above, and a quality measure $Q_m$ is derived for each speech segment m. The derived quality measures for each speech segment are stored in a memory 120. More specifically, in some embodiments, the memory 120 may store a summary $Q_{1...M}$ of the quality measures for all of the received speech segments, as shown at 120a in FIG. 4, as a fixed size amount of data. Alternatively, the quality measures $Q_1, ..., Q_M$ for all received speech segments or a number of the most recently received speech segments can be stored separately, as shown at 120b in FIG. 4, so that they can be applied as required, as discussed below.

The quality measures may for example be based on properties of the respective speech segments. Certain speech fragments or utterances will be more suitable for use in voice biometrics than others because they are longer in duration, or because they contain more phonetic variability and thus they provide more information to differentiate speakers. Other aspects, such as the presence of non-stationary noise in speech segments may make one speech segment more reliable than another.

One suitable quality measure is the Signal to Noise Ratio (SNR), which may for example be measured in the each speech segment separately. In the case of non-stationary noise, where the SNR varies rapidly, higher weights can be given to the results obtained from received speech segments that have higher SNRs.

In this case, the combined scoring information can be formed as a weighted sum of the compact scoring information derived from the received speech segments, with the weightings being determined based on the relative quality of each speech segment.

That is, the compact scoring information $C_{M+1}$ obtained from the most recently received speech segment is combined with the previously accumulated compact scoring information $C_{1\ldots M}$ obtained from the segments m=1, 2, . . . , M, to form a weighted sum $C_{1\ldots M+1}$, so that the new segment has more or less weight in the new combined scoring information, depending on its quality relative to the previous available data. Thus:

$$C_{1\ldots M+1} = \alpha_{1\ldots M} C_{1\ldots M} + \alpha_{M+1} C_{M+1} =$$
$$= \left\{ \alpha_{1\ldots M} \sum_M N(m) + \alpha_{M+1} N(M+1), \right.$$
$$\alpha_{1\ldots M} \sum_M F(m) + \alpha_{M+1} F(M+1),$$
$$\left. \alpha_{1\ldots M} \sum_M S(m) + \alpha_{M+1} S(M+1) \right\}$$

where $\alpha_{1\ldots M}$=f($Q_1$, . . . , $Q_M$) and $\alpha_m$=f($Q_m$) are weights computed from the quality or reliability measures.

The newly obtained combined scoring information $C_{1\ldots M+1}$ is stored in the memory 122.

In some embodiments, it is also possible to summarize the quality measures and specifically it is possible to summarize the quality for the accumulated scoring information $Q_1$, . . . , $Q_M$ to a fixed size summary $Q_{1\ldots M}$ so that $\alpha_{1\ldots M}$=f($Q_1$, . . . , $Q_M$)=f($Q_{1\ldots M}$). This could be achieved, for example, by computing quality statistics needed for estimating $\alpha_{1\ldots M}$. These statistics could be, for example, the number of segments M and the sum of the quality measures of the individual segments:

$$Q_{1\ldots M} = \left\{ M, \sum_M Q_m \right\}$$

Alternatively, higher order statistics could be included.

In the first embodiment described above, the combination block 118 combines one piece of previously derived compact scoring information (for example one set of sufficient statistics), which acts as a summary of the features extracted from all previously available input audio in the current user interaction or context with the newly derived compact scoring information that acts as a summary of the features extracted from the newly available audio.

In a second embodiment, which is an alternative to the first embodiment, the combination block 118 forms the combined compact scoring information by storing the scoring information derived from the features extracted from the newly received speech segment of the audio signal together with the separate respective pieces of scoring information (for example the separate sets of sufficient statistics) derived from the features extracted from selected previous speech segments. In this case, the previously derived compact scoring information $C_1$, . . . , $C_M$ for every speech segment may be stored separately in the memory 122, as shown at 122b in FIG. 4. Then, when a new speech segment is received, some or all of the previous speech segments are selected and the compact scoring information obtained from those selected speech segments is combined with the scoring information from the new speech segment.

In order to select the relevant set of previous compact scoring information, quality measures associated with each compact scoring information can be used. These quality measures can be used to weight each instance of compact scoring information.

Thus, for every new chunk of audio, the accumulated compact scoring information may be obtained as function of all the instances of compact information available:

$$C_{1\ldots M+1} = \sum_{m=1}^{M+1} \alpha_m C_m$$
$$= \left\{ \sum_{m=1}^{M+1} \alpha_m N(m), \right.$$
$$\sum_{m=1}^{M+1} \alpha_m F(m),$$
$$\left. \sum_{m=1}^{M+1} \alpha_m S(m) \right\}$$

where again $\alpha_m$=f($Q_m$) is a function of the quality measures for the speech segment m. However, $\alpha_m$ may be set to zero for one or more of the previous speech segments.

This approach would allow for the possibility that the way in which the previous speech segments are selected, and/or the way in which compact scoring information obtained from those selected speech segments is combined with the scoring information from the new speech segment could potentially be varied after any new segment.

However, this approach would not guarantee that the amount of the stored compact scoring information and quality measures would stay within a predefined limit, as there is no upper limit on the number of speech segments. In order to mitigate this, a circular buffer may be used, so that the compact scoring information from a fixed number of most recently received speech segments is stored. The compact scoring information instances related to speech segments not considered as part of the most recently received speech segments could be discarded, or alternatively could be further summarized in a single instance of compact scoring information, so that there is a predefined maximum number of instances of compact scoring information to be stored.

Thus, the memory 122 may store a summary of all of the available data as scoring information having a fixed size as shown at 122a, or may store separate compact scoring information for some or all of the received speech segments as shown at 122b, so that they can be selected and combined with the scoring information obtained from a new speech segment.

The combined scoring information is then passed to a scoring block 124 to obtain a voice biometrics score based on the summary of the current input speech segment and previous input speech segments.

The voice biometrics score can be computed from the compact scoring information using any desired technique that is compatible with the compact scoring information obtained previously. Many well-known voice biometrics techniques, such as techniques based on a Gaussian Mixture Model Universal Background Model (GMM-UBM), GMM Maximum a Posteriori (MAP) Joint Factor Analysis (JFA), or i-vectors can be calculated in an exact way from the UBM sufficient statistics described above.

Reference was made above to the use of sufficient statistics as the compact scoring information, but this may take an even more compressed form, referred to as miniStats. MiniStats are projection of sufficient statistics in subspaces of low dimensionality. The resulting vectors is the sufficient information that we need to compute scores. The advantage of miniStats is that the stored information to compute scores is smaller than the original information stored with the sufficient statistics. The necessary condition to be able to summarize stats in miniStats is that the distributive property can be applied on miniStats in the formula to compute the score to decide if a trial is target or not.

In a JFA system, in order to compute a score, we need to perform the following calculations involving sufficient statistics:

$$U*\Sigma^{-1}*F$$

where U is a concatenation of as many matrices as factors we have defined of size $R\times(C*D)$, R being the sum of dimensions of all factors, C the number of Gaussians and D the dimensionality of the features, $\Sigma$ is the covariance matrix of size $(C*D)\times(C*D)$, including zero blocks as defined above, and F is the supervector of first order sufficient statistics of size $(C*D)\times 1$.

Thus, if we store the result of this operation, we will save a vector of size $R\times 1$ instead of the sufficient statistics of size $(C*D)\times 1$. The distributive operation can be applied in this operation because, if we have $F_1$ being the supervector of sufficient statistics at time 1 and $F_2$ at time 2, we have that $$U*\Sigma^{-1}*F1+U*\Sigma^{-1}*F2=U*\Sigma^{-1}*(F_1+F_2),$$

and saving the addition of miniStats gives the same result as the projection of the sum of sufficient statistics.

U is the concatenation of all subspace factor loading matrices that we have and we want to marginalize during the scoring. Hence, U can be just the channel matrix if we only define a channel factor, or the concatenation of channel and speaker matrix if we define channel and speaker factors.

In short, the miniStats vector of order 1 is $U*\Sigma^{-1}*F$.

Another calculation that we need to perform in JFA is $$tr(\Sigma^{-1}*S)$$

where tr is the trace operator and S is the second order sufficient statistics. In this case, if we save the result of this operation we pass from the size of S, which is $C*(D\times D)$ to the size of the result of the trace operation, which is 1. And the distributive operation also applies, since $$tr(\Sigma^{-1}*S_1)+tr(\Sigma^{-1}*S_2)=tr(\Sigma^{-1}*(S_1+S_2))$$

In short, the miniStats of order 2 is the scalar $tr(\Sigma^{-1}*S)$.

Thus, in these embodiments, the scoring information that is calculated and stored is not simply the sufficient statistics, but rather is the projection of the sufficient statistics that are needed to update the scores (referred to above as miniStats). These miniStats are compact vectors that contain all the score information relative to past segments and that, combined with the miniStats of the current segment allow us to update the score with the new information. Thus, the previous audio information that is needed to update the score is compressed.

This information is richer than just simply averaging the scores of the different segments, because the miniStats keep track of information about the Gaussians visited by features, and not all Gaussians contribute the same to the score. For example, in a situation where there are two segments with 1 feature each, and with each feature falling in a different Gaussian. In an approach based on averaging, both Gaussians would receive the same importance. However, in the approach using miniStats, as described here, we seamlessly update the miniStats and each Gaussian conserves its total importance.

Suitable forms of miniStats can also be used, when the classification is based on GMM Maximum a Posteriori (MAP) Joint Factor Analysis (JFA), or three-mode factor analysis (TMFA).

When the classification is based on probabilistic linear discriminant analysis (PLDA), the compact scoring information can be based on the PLDA statistics described for example in EP-2897076A.

The voice biometrics score indicates a likelihood that the user is the enrolled user. The voice biometrics score indicative of the likelihood may be for example a log likelihood ratio (LLR) or may be some more indirect indication, for example a metric of distance of extracted features of the speech sample from some one- or multi-dimensional threshold or nominal point or volume in a multi-dimensional speech parameter space.

The voice biometrics score is passed to a decision block 126, in which an authentication decision is made, based on the score.

The authentication decision may for example have two possible values, namely "user authenticated" and "user not authenticated". The authentication decision may be obtained by comparing the voice biometrics score with a threshold value. The threshold value may be fixed, or may depend on some variable criterion. For example, the threshold value may be determined by a security level. For a low security system, or a low security command within a system, a relatively high False Acceptance Rate (FAR) may be tolerable, and so a low threshold may be set. In that case, a relatively low voice biometrics score, representing a relatively low degree of confidence that the user is the enrolled user, may still exceed the threshold. For a high security system, or a high security command within a system, a relatively low False Acceptance Rate (FAR) may be required, and so a high threshold may be set, such that only a high voice biometrics score, representing a high degree of confidence that the user is the enrolled user, will exceed the threshold.

An input indicating the required security level may be received from an external process, for example from a speech recognition process determining the content of the user's speech, and so this may be used to set the threshold value. The decision block 126 may store multiple threshold values, with one of these threshold values being chosen in response to a signal received from the external process, and the authentication decision then being obtained by comparing the voice biometrics score with the selected threshold value.

In some embodiments, the voice biometrics score may be compared with multiple threshold values, to give multiple provisional authentication results. In this example, the system may include multiple registers to store corresponding authentication flags, indicating the results of comparing the authentication score with the respective threshold values.

The authentication decision may then be output in response to an authentication request.

Thus, the authentication decision may be based on the score alone.

Alternatively, the authentication decision may be based on one or more other input. For example, the user's spoken interaction with the system may include a predetermined trigger phrase, which may for example be used to wake the system from a low-power mode, plus a command (which may itself be formed from multiple discrete utterances as a result of interaction with the voice user interface). In such cases, the trigger phrase may be processed using a text-dependent speaker recognition system, because the trigger phrase is known in advance, and this may be used to generate a text-dependent authentication score. The method described above may then be used to generate an authentication score for the command, which may be updated after each new speech segment. The text-dependent authentication score and the authentication score for the command may then be combined to produce a final authentication score. The text-dependent authentication score and the authentication score for the command may for example be combined in a weighted sum, with the weights applied to each score depending on quality factors such as the signal-to-noise ratio of the audio signal and/or the amounts of net speech present in the trigger and the command. This final authentication score can itself be updated after each new speech segment of the command, and can be used to produce the authentication decision whenever it is required.

In other embodiments, the predetermined trigger phrase could be used as a part of the speech signal that is processed using the methods described herein.

In some embodiments, the method of speaker identification described herein is intended to distinguish the speech of an enrolled user from the speech of other people, and the authentication scoring is aimed at that. In other embodiments, the method of speaker identification described herein is intended to detect a "spoofing" or "replay" attack, where a third party plays a recording of the enrolled user's speech. In such embodiments, the feature extraction, and the scoring is designed to distinguish the "live" speech of the enrolled user from the replayed speech of the same enrolled user. Thus, compact scoring information is used to summarize all received speech data so that it can be used to make an authentication decision. This scoring information can be updated as each new speech segment is received, allowing an authentication decision based on all the useful received speech to be made quickly when an authentication is requested.

The skilled person will thus recognise that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Embodiments of the invention may be arranged as part of an audio processing circuit, for instance an audio circuit which may be provided in a host device. A circuit according to an embodiment of the present invention may be implemented as an integrated circuit.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like. Embodiments may be implemented in other forms of device such as a remote controller device, a toy, a machine such as a robot, a home automation controller or suchlike.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of speaker identification, comprising:
 receiving a speech signal;
 dividing the speech signal into segments; and
 following each segment:
 extracting a plurality of features from a most recently received segment;
 deriving scoring information comprising sufficient statistics of the extracted features of the most recently received segment;
 combining the scoring information derived from the extracted features of the most recently received segment with previously stored scoring information comprising sufficient statistics of the extracted features of any previously received segment to form updated combined scoring information comprising sufficient statistics of the entire received speech signal to date, wherein the updated combined scoring information requires the same number of bits of memory as the previously stored scoring information;
 storing the updated combined scoring information; and
 calculating an identification score by comparing the updated combined scoring information with a previously stored model of speech of an enrolled speaker, such that the calculated identification score indicates a likelihood that the received speech signal represents the speech of the enrolled speaker.

2. A method according to claim 1, wherein the segments are of equal lengths.

3. A method according to claim 2, comprising dividing the speech signal into segments covering equal length periods of time.

4. A method according to claim 2, comprising dividing the speech signal into segments containing equal durations of net speech.

5. A method according to claim 1, wherein the features of the speech signal comprise Mel Frequency Cepstral Coefficients (MFCCs).

6. A method according to claim 1, wherein the sufficient statistics comprise zeroth order sufficient statistics.

7. A method according to claim 1, wherein the sufficient statistics comprise first order sufficient statistics.

8. A method according to claim 1, wherein the sufficient statistics comprise second order sufficient statistics.

9. A method according to claim 1, wherein deriving scoring information from the extracted features of the most recently received segment further comprises calculating a projection of the sufficient statistics in a subspace of low dimensionality.

10. A method according to claim 1, comprising: combining the scoring information derived from the extracted features of the most recently received segment with any previously stored scoring information derived from the extracted features of any previously received segment by forming a weighted sum of (a) the scoring information derived from the extracted features of the most recently received segment, and (b) the previously stored scoring information.

11. A method according to claim 10, comprising forming the weighted sum by applying respective weights to (a) the scoring information derived from the extracted features of the most recently received segment, and (b) the previously stored scoring information, based on respective quality measures of said scoring information.

12. A method according to claim 11, wherein the respective quality measures relate to amounts of speech in the respective speech segments.

13. A method according to claim 11, wherein the respective quality measures relate to a quality of respective sections of the speech signal.

14. A non-transitory computer readable storage medium having computer-executable instructions stored thereon that, when executed by processor circuitry, cause the processor circuitry to perform a method according to claim 1.

15. A system for speaker identification, comprising:
an input for receiving a speech signal; and
a processor for:
dividing the speech signal into segments; and
following each segment:
extracting a plurality of features from a most recently received segment;
deriving scoring information comprising sufficient statistics for the extracted features of the most recently received segment;
combining the scoring information derived from the extracted features of the most recently received segment with previously stored scoring information comprising sufficient statistics for the extracted features of any previously received segment;
storing the combined scoring information comprising sufficient statistics for the entire received speech signal to date; and
calculating an identification score by comparing the combined scoring information with a previously stored model of speech of an enrolled speaker, such that the calculated identification score indicates a likelihood that the received speech signal represents the speech of the enrolled speaker.

16. A device comprising a system as claimed in claim 15.

17. A device as claimed in claim 16, wherein the device comprises a mobile telephone, an audio player, a video player, a mobile computing platform, a games device, a remote controller device, a toy, a machine, or a home automation controller or a domestic appliance.

* * * * *